(12) United States Patent
Kim et al.

(10) Patent No.: US 7,424,991 B2
(45) Date of Patent: Sep. 16, 2008

(54) DISPLAY APPARATUS

(75) Inventors: Ju-hwan Kim, Suwon (KR); Dae-hyoun Byoun, Seoul (KR); Dong-hyug Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 31 days.

(21) Appl. No.: 10/671,863

(22) Filed: Sep. 29, 2003

(65) Prior Publication Data

US 2004/0118984 A1  Jun. 24, 2004

Related U.S. Application Data

(60) Provisional application No. 60/413,776, filed on Sep. 27, 2002.

(30) Foreign Application Priority Data

Nov. 5, 2002  (KR)  ........................ 10-2002-0068264

(51) Int. Cl.
*A47F 5/00* (2006.01)

(52) U.S. Cl. .................. 248/125.9; 248/121; 248/125.8; 248/917; 248/919

(58) Field of Classification Search ................. 248/149, 248/125.8, 125.1, 917, 919, 920, 922, 923, 248/176.1, 121
See application file for complete search history.

(56) References Cited

U.S. PATENT DOCUMENTS

| | | |
|---|---|---|
| 2,041,370 A | 5/1936 | Pottorff |
| 2,042,443 A | 5/1936 | Buckstone |
| 2,628,142 A | 2/1953 | Dubach |
| 2,890,010 A | 6/1959 | Barkheimer |
| 3,285,207 A | 11/1966 | Von Hagen |
| 3,434,684 A | 3/1969 | Warden |
| 3,788,587 A | 1/1974 | Stemmler |
| 3,905,311 A | 9/1975 | Carpentier |
| 4,113,215 A | 9/1978 | Stapleton |
| 4,166,522 A | 9/1979 | Bourcier de Carbon |
| 4,235,405 A | 11/1980 | Carey |
| 4,329,800 A | 5/1982 | Shuman |

(Continued)

FOREIGN PATENT DOCUMENTS

CN       1031010 C     2/1996

(Continued)

OTHER PUBLICATIONS

U.S. Appl. No. 10/295,831, filed Nov. 18, 2002, Hyun-jun Jung et al., Samsung Electronics Co, LTD.

(Continued)

*Primary Examiner*—Amy J. Sterling
(74) *Attorney, Agent, or Firm*—Staas & Halsey LLP (57) ABSTRACT

A display apparatus includes a base part, a main body, a slider connected to the main body, a guide rail to stand on the base part, and to guide the slider to slide thereon to move the main body up and down. The display apparatus also includes at least one spiral spring having an elasticity enough to support weight of the main body to extend and contract in response to a movement of the slider. Accordingly, the display apparatus has an improved structure of conveniently adjusting a position of the main body due to the slider being slid smoothly along the guide bracket.

34 Claims, 6 Drawing Sheets

U.S. PATENT DOCUMENTS

| | | | |
|---|---|---|---|
| 4,339,104 A | 7/1982 | Weidman | |
| 4,395,010 A | 7/1983 | Helgeland et al. | |
| 4,438,458 A | 3/1984 | Münscher | |
| 4,447,031 A | 5/1984 | Souder, Jr. et al. | |
| 4,601,246 A * | 7/1986 | Damico | 108/146 |
| 4,616,218 A | 10/1986 | Bailey et al. | |
| 4,669,694 A | 6/1987 | Malick | |
| 4,690,362 A | 9/1987 | Helgeland | |
| 4,691,886 A | 9/1987 | Wedling et al. | |
| 4,729,533 A | 3/1988 | Hillary et al. | |
| D295,415 S | 4/1988 | Thies et al. | |
| 4,768,744 A | 9/1988 | Leeds et al. | |
| 4,777,750 A | 10/1988 | Garfinkle | |
| 4,834,329 A | 5/1989 | Delapp | |
| 4,846,434 A | 7/1989 | Krogsrud | |
| 4,859,092 A | 8/1989 | Makita | |
| 4,864,601 A | 9/1989 | Berry | |
| 4,924,931 A | 5/1990 | Miller | |
| D313,405 S | 1/1991 | Barry et al. | |
| 4,989,813 A | 2/1991 | Kim et al. | |
| 5,012,852 A | 5/1991 | Blackhurst | |
| 5,088,676 A | 2/1992 | Orchard et al. | |
| 5,102,084 A | 4/1992 | Park | |
| 5,107,402 A | 4/1992 | Malgouires | |
| 5,112,019 A | 5/1992 | Melzler et al. | |
| 5,144,290 A | 9/1992 | Honda et al. | |
| 5,163,652 A | 11/1992 | King | |
| 5,206,790 A | 4/1993 | Thomas et al. | |
| D337,104 S | 7/1993 | Orchard | |
| D349,489 S | 8/1994 | Wang | |
| 5,335,142 A | 8/1994 | Anderson | |
| 5,383,138 A | 1/1995 | Motoyama et al. | |
| 5,422,951 A | 6/1995 | Takahashi et al. | |
| 5,437,236 A | 8/1995 | Zeiner | |
| 5,549,264 A | 8/1996 | West | |
| 5,634,537 A | 6/1997 | Thorn | |
| 5,751,548 A | 5/1998 | Hall et al. | |
| 5,758,849 A | 6/1998 | Bui et al. | |
| 5,771,152 A | 6/1998 | Crompton et al. | |
| 5,799,917 A | 9/1998 | Li | |
| 5,812,368 A | 9/1998 | Chen et al. | |
| 5,835,342 A | 11/1998 | Hunte | |
| 5,876,008 A | 3/1999 | Sweere et al. | |
| 5,894,633 A | 4/1999 | Kaneko | |
| 5,904,328 A | 5/1999 | Leveridge et al. | |
| 5,911,523 A | 6/1999 | Burchart | |
| 5,924,665 A | 7/1999 | Sweere et al. | |
| 5,941,493 A | 8/1999 | Cheng | |
| 5,975,472 A | 11/1999 | Hung | |
| 5,992,809 A | 11/1999 | Sweere et al. | |
| 5,997,493 A | 12/1999 | Young | |
| 6,012,693 A | 1/2000 | Voeller et al. | |
| 6,015,120 A | 1/2000 | Sweere et al. | |
| 6,018,847 A | 2/2000 | Lu | |
| 6,031,714 A | 2/2000 | Ma | |
| 6,062,148 A * | 5/2000 | Hodge et al. | 108/147 |
| 6,064,373 A | 5/2000 | Ditzik | |
| 6,081,420 A | 6/2000 | Kim et al. | |
| 6,113,046 A | 9/2000 | Wang | |
| 6,116,690 A | 9/2000 | Larson | |
| 6,134,103 A | 10/2000 | Ghanma | |
| 6,145,797 A | 11/2000 | Uehara | |
| 6,164,611 A | 12/2000 | Kuhnke | |
| 6,168,124 B1 | 1/2001 | Matsuoka et al. | |
| 6,189,842 B1 | 2/2001 | Bergeron Gull et al. | |
| 6,189,849 B1 | 2/2001 | Sweere et al. | |
| 6,189,850 B1 | 2/2001 | Liao et al. | |
| 6,231,021 B1 | 5/2001 | Hong | |
| 6,233,138 B1 | 5/2001 | Osgood | |
| 6,270,047 B1 * | 8/2001 | Hudson | 248/286.1 |
| 6,276,655 B1 | 8/2001 | Byoun | |
| 6,286,794 B1 | 9/2001 | Harbin | |
| 6,288,891 B1 | 9/2001 | Hasegawa et al. | |
| 6,305,659 B1 | 10/2001 | Metelski | |
| 6,326,955 B1 | 12/2001 | Ditzik | |
| 6,347,433 B1 | 2/2002 | Novin et al. | |
| 6,352,226 B1 | 3/2002 | Gordon | |
| 6,367,756 B1 | 4/2002 | Wang | |
| 6,378,830 B1 | 4/2002 | Lu | |
| 6,381,125 B1 | 4/2002 | Mizoguchi et al. | |
| 6,390,433 B1 | 5/2002 | Kasa-Djukic | |
| 6,394,403 B1 | 5/2002 | Hung | |
| 6,397,761 B1 | 6/2002 | Moore | |
| 6,402,109 B1 | 6/2002 | Dittmer | |
| 6,409,134 B1 | 6/2002 | Oddsen, Jr. | |
| 6,418,010 B1 | 7/2002 | Sawyer | |
| 6,419,196 B1 | 7/2002 | Sweere et al. | |
| 6,430,038 B1 | 8/2002 | Helot et al. | |
| 6,478,275 B1 | 11/2002 | Huang | |
| 6,494,150 B1 | 12/2002 | Phoenix et al. | |
| 6,499,704 B2 | 12/2002 | Oddsen, Jr. | |
| 6,502,792 B1 | 1/2003 | Cho et al. | |
| 6,522,530 B2 | 2/2003 | Bang | |
| 6,532,628 B2 | 3/2003 | Kim | |
| 6,585,201 B1 | 7/2003 | Reed | |
| 6,592,090 B1 | 7/2003 | Li | |
| 6,601,810 B2 | 8/2003 | Lee | |
| 6,609,272 B1 | 8/2003 | Lee | |
| 6,609,686 B2 * | 8/2003 | Malizia | 248/125.8 |
| 6,672,553 B1 | 1/2004 | Lin | |
| 6,680,843 B2 | 1/2004 | Farrow et al. | |
| 6,695,266 B1 * | 2/2004 | Tsai | 248/125.8 |
| 6,695,274 B1 | 2/2004 | Chiu | |
| 6,698,063 B2 | 3/2004 | Kim et al. | |
| 6,702,238 B1 * | 3/2004 | Wang | 248/125.8 |
| 6,708,940 B2 | 3/2004 | Ligertwood | |
| 6,712,321 B1 * | 3/2004 | Su et al. | 248/123.11 |
| D489,370 S | 5/2004 | Jobs et al. | |
| 6,766,994 B2 * | 7/2004 | Serbinski et al. | 248/371 |
| 6,769,657 B1 | 8/2004 | Huang | |
| 6,796,541 B2 | 9/2004 | Lu | |
| 6,819,550 B2 | 11/2004 | Jobs et al. | |
| 6,822,857 B2 | 11/2004 | Jung et al. | |
| 6,837,469 B2 | 1/2005 | Wu et al. | |
| 6,857,610 B1 | 2/2005 | Conner et al. | |
| 6,874,743 B2 | 4/2005 | Watanabe et al. | |
| 6,889,958 B2 | 5/2005 | Hoffend, Jr. | |
| 6,905,099 B2 | 6/2005 | Sung | |
| 6,954,221 B2 | 10/2005 | Wu | |
| 7,055,218 B2 | 6/2006 | Lu et al. | |
| 7,168,665 B2 | 1/2007 | Hong et al. | |
| 7,177,144 B2 | 2/2007 | Ha et al. | |
| 7,195,214 B2 | 3/2007 | Lee et al. | |
| 7,237,755 B2 | 7/2007 | Cho et al. | |
| 2001/0017761 A1 | 8/2001 | Ditzik | |
| 2002/0011544 A1 | 1/2002 | Bosson | |
| 2002/0020792 A1 | 2/2002 | Lee | |
| 2002/0130981 A1 | 9/2002 | Ma et al. | |
| 2002/0145088 A1 * | 10/2002 | Santoro et al. | 248/188.2 |
| 2003/0075649 A1 * | 4/2003 | Jeong et al. | 248/157 |
| 2003/0075653 A1 | 4/2003 | Li | |
| 2003/0080949 A1 | 5/2003 | Ditzik | |
| 2003/0086240 A1 | 5/2003 | Jobs et al. | |
| 2003/0132360 A1 | 7/2003 | Ju | |
| 2003/0142474 A1 | 7/2003 | Karidis et al. | |
| 2004/0011932 A1 * | 1/2004 | Duff | 248/157 |
| 2004/0056161 A1 * | 3/2004 | Ishizaki et al. | 248/176.3 |
| 2004/0057197 A1 | 3/2004 | Hill et al. | |
| 2004/0084585 A1 * | 5/2004 | Watanabe et al. | 248/276.1 |
| 2004/0084588 A1 * | 5/2004 | Liu et al. | 248/291.1 |

| | | |
|---|---|---|
| 2004/0118984 A1 | 6/2004 | Kim et al. |

FOREIGN PATENT DOCUMENTS

| | | |
|---|---|---|
| CN | 2504675 | 8/2002 |
| DE | 2847135 | 5/1980 |
| DE | 39 43 137 A1 | 8/1991 |
| DE | 200 09 691 | 11/2000 |
| DE | 4214341 A1 | 7/2003 |
| EP | 0 046 225 | 2/1982 |
| EP | 244 566 | 11/1987 |
| EP | 631 174 B1 | 4/1998 |
| EP | 1 085 753 | 3/2001 |
| EP | 1085753 | 3/2001 |
| GB | 2 206 464 | 1/1989 |
| GB | 2 277 439 | 11/1994 |
| JP | 57-151990 | 9/1982 |
| JP | 61-99873 | 5/1986 |
| JP | 61-99874 | 5/1986 |
| JP | 61-196314 | 8/1986 |
| JP | 62-96681 | 5/1987 |
| JP | 62-96682 | 6/1987 |
| JP | 62-239677 | 10/1987 |
| JP | 1-273086 | 10/1989 |
| JP | 2-58783 | 4/1990 |
| JP | 2-215408 | 8/1990 |
| JP | 02-215408 | 8/1990 |
| JP | 03-2381 | 1/1991 |
| JP | 3-29800 | 3/1991 |
| JP | 03-29800 | 3/1991 |
| JP | 3-095586 | 4/1991 |
| JP | 03-113423 | 11/1991 |
| JP | 3-113423 | 11/1991 |
| JP | 3-114875 | 11/1991 |
| JP | 03-114875 | 11/1991 |
| JP | 4-15680 | 1/1992 |
| JP | 04-33073 | 3/1992 |
| JP | 4-33073 | 3/1992 |
| JP | 4-81182 | 3/1992 |
| JP | 04-81182 | 3/1992 |
| JP | 4-107284 | 4/1992 |
| JP | 4-155375 | 5/1992 |
| JP | 4-198979 | 7/1992 |
| JP | 3-017022 | 9/1992 |
| JP | 4-132517 | 12/1992 |
| JP | 5-36523 | 2/1993 |
| JP | 5-097098 | 4/1993 |
| JP | 5-36423 | 5/1993 |
| JP | 05-36423 | 5/1993 |
| JP | 5-188865 | 7/1993 |
| JP | 05-66715 | 9/1993 |
| JP | 6-4778 | 1/1994 |
| JP | 64778 | 1/1994 |
| JP | 6-37912 | 2/1994 |
| JP | 6-21079 | 3/1994 |
| JP | 6-118880 | 4/1994 |
| JP | 8-121009 | 5/1996 |
| JP | 8-234672 | 9/1996 |
| JP | 8-319753 | 12/1996 |
| JP | 10-126068 | 5/1998 |
| JP | 10-214034 | 8/1998 |
| JP | 10-228333 | 8/1998 |
| JP | 11-006520 | 1/1999 |
| JP | 11-095866 | 4/1999 |
| JP | 11-154460 | 6/1999 |
| JP | 11-214859 | 8/1999 |
| JP | 11-338576 | 12/1999 |
| JP | 2000-019981 | 1/2000 |
| JP | 2000-56695 | 2/2000 |
| JP | 3068198 | 2/2000 |
| JP | 2000-122561 | 4/2000 |
| JP | 2000-206893 | 7/2000 |
| JP | 2000-206901 | 7/2000 |
| JP | 2000-242363 | 9/2000 |
| JP | 3073553 | 9/2000 |
| JP | 2000267581 | 9/2000 |
| JP | 2001-50244 | 2/2001 |
| JP | 2001-142407 | 5/2001 |
| JP | 2001-202026 | 7/2001 |
| JP | 2001-241427 | 9/2001 |
| JP | 20026990 | 1/2002 |
| KR | 1997-63717 | 12/1977 |
| KR | 1989-3755 | 6/1989 |
| KR | 88-3444 | 10/1989 |
| KR | 1989-20328 | 10/1989 |
| KR | 1991-0009310 | 5/1991 |
| KR | 114350 | 11/1997 |
| KR | 1998-4698 | 3/1998 |
| KR | 163133 | 9/1998 |
| KR | 1998-54989 | 12/1998 |
| KR | 1999-40596 | 6/1999 |
| KR | 1999-0040596 | 6/1999 |
| KR | 1999-0073869 | 10/1999 |
| KR | 20-168389 | 11/1999 |
| KR | 2000-722 | 1/2000 |
| KR | 2000-725 | 1/2000 |
| KR | 2000-827 | 1/2000 |
| KR | 20-182808 | 3/2000 |
| KR | 20-184275 | 3/2000 |
| KR | 20-0178710 | 4/2000 |
| KR | 20-0191805 | 8/2000 |
| KR | 20-215332 | 12/2000 |
| KR | 2000-73608 | 12/2000 |
| KR | 10-0289438 | 2/2001 |
| KR | 2002-5136 | 2/2001 |
| KR | 20-227925 | 4/2001 |
| KR | 20-227953 | 4/2001 |
| KR | 2001-35722 | 5/2001 |
| KR | 2001-0035722 | 5/2001 |
| KR | 20-0227925 | 6/2001 |
| KR | 20-239991 | 7/2001 |
| KR | 2001-53963 | 7/2001 |
| KR | 2001-56960 | 7/2001 |
| KR | 2001-83865 | 9/2001 |
| KR | 20-251611 | 10/2001 |
| KR | 20-0253576 | 11/2001 |
| KR | 20-0256013 | 11/2001 |
| KR | 20-256013 | 11/2001 |
| KR | 20-256809 | 11/2001 |
| KR | 20-259625 | 12/2001 |
| KR | 20002-5136 | 1/2002 |
| KR | 2002-0029616 | 4/2002 |
| KR | 20-0279427 | 6/2002 |
| KR | 20-279427 | 6/2002 |
| KR | 10-353035 | 9/2002 |
| KR | 20-295990 | 11/2002 |
| KR | 20-304340 | 2/2003 |
| KR | 2003-0058204 | 7/2003 |

OTHER PUBLICATIONS

U.S. Appl. No. 10/314,350, filed Dec. 1, 2002, Sang-kyeong Ha et al., Samsung Electronics Co. LTD.

U.S. Appl. No. 10/646,864, filed Apr. 1, 2003, You-Sik Hong et al., Samsung Electronics Co. LTD.

U.S. Appl. No. 10/671,605, filed Sep. 1, 2003, Jun-soo Jeong., Samsung Electronics Co. LTD.

U.S. Appl. No. 10/671,863, filed Sep. 1, 2003, Ju-hwan Kim et al., Samsung Electronics Co. LTD.

U.S. Appl. No. 10/694,029, filed Oct. 1, 2003, Nam-il Cho et al., Samsung Electronics Co. LTD.

U.S. Appl. No. 10/694,041, filed Oct. 1, 2003, You-Sub Lee et al., Samsung Electronics Co. LTD.

U.S. Appl. No. 10/705,770, filed Nov. 1, 2003, Ju-hwan Kim et al., Samsung Electronics Co. LTD.

U.S. Appl. No. 10/792,745, filed Mar. 1, 2004, Sang-kyeong Ha et al., Samsung Electronics Co. LTD.
U.S. Appl. No. 10/916,436, filed Aug. 12, 2004, Hyun-jun Jung et al., Samsung Electronics Co, LTD.
U.S. Appl. No. 10/916,447, filed Aug 12, 2004, Hyun-jun Jung et al., Samsung Electronics Co, LTD.
U.S. Appl. No. 10/406,269, filed Apr. 4, 2003, You-sik Hong et al., Samsung Electronics Co, LTD.
Vesa Mounting Interface Standard, Mar. 19, 2003, 2 pages, www.ergotron.com/2_Product_pages/FP_ARMS/VESA/fp_vesa.asp.
Third Party Submission document filed Aug. 27, 2004 in Korean Industrial Property Office, issued Sep. 22, 2004.
Chinese Office Action of Application No. 03110326.X issued Sep. 24, 2004.
Chinese Office Action of Application No. 03154931.4 issued Sep. 9, 2005.
Singapore Office Action issued on May 13, 2005.
Korean Office Action issued on Jul. 26, 2004.
Japanese Office Action mailed Sep. 21, 2004 in JP 2002-333914.
Japanese Office Action mailed Jun. 14, 2005 in JP 2002-333914.
Korean Office Action issued on Mar. 16, 2005.
Korean Office Action issued on Aug. 20, 2004.
SIPO Office Action issued on Sep. 9, 2005.
Korean Office Action issued on Mar. 8, 2006 in Korean Patent Appl. No. 10-2002-0050351 which corresponds to co-pending U.S. Appl. No. 10/646,864.
U.S. Appl. No. 11/889,998, filed Aug. 17, 2007, Kim Ju-hwan et al, Samsung Electronics Co., Ltd.
U.S. Patent Publication No. 2006/01219849 published Oct. 5, 2006 to Chiu.

* cited by examiner

FIG. 5

DISPLAY APPARATUS

CROSS-REFERENCE TO RELATED APPLICATION

This application claims the benefit of U.S. Provisional No. 60/413,776 filed Sep. 27, 2002, and Korean Application No. 2002-68264 filed Nov. 5, 2002 in the Korean Intellectual Property Office, the disclosures of which are incorporated herein by reference.

BACKGROUND OF THE INVENTION

1. Field of the Invention

The present invention relates, in general, to a display apparatus, and in particular, to a display apparatus having an improved structure of conveniently adjusting a position (that is, the height) of a monitor body.

2. Description of the Related Art

Recently, display apparatuses have been increasingly demanded as personal computers have come into wide use. In order to cope with such demands from a variety of consumers, display apparatuses employing a variety of functions have been provided to increase the consumers convenience when using them.

As an example, Korean Utility Model Registration No. 20-279427 discloses a display apparatus including a monitor body, a base, a stand to stand on the base, a plate fixed on a bracket in a rear of the monitor body and extended downward, a guide plate fixed on the stand and having a pair of rail grooves, and a slider having a projection to be inserted into the rail grooves of the guide plate and to move up and down along the guide plate. The display apparatus also includes a pusher fixed to a lower part of the slider, and being provided with a semi-circular seating hole in a bottom thereof. The display apparatus includes a spiral spring having a first end fixed to the stand and a second end displaced in the seating hole of the pusher as curled, to elastically support the monitor body in a direction opposite to a weight of the monitor body.

In the conventional display apparatus with the above configuration, since friction is generated when the slider is moved along the guide plate, the slider connected to the monitor body is not smoothly moved along the guide plate when a user wishes to move the monitor body downward. Therefore, the user may experience problems in adjusting the position of the monitor body.

In addition, friction is generated between a mounting place of the spiral spring and the spiral spring, and accordingly, the monitor body is not smoothly moved because of the spiral spring.

SUMMARY OF THE INVENTION

Accordingly, it is an aspect of the present invention to provide a display apparatus having an improved structure of conveniently adjusting a position of a monitor body.

Additional aspects and advantages of the invention will be set forth in part in the description which follows and, in part, will be obvious from the description, or may be learned by practice of the invention.

The foregoing and/or other aspects of the present invention are achieved by providing a display apparatus including a base part, a main body, a slider connected to the main body, a guide rail to stand on the base part, and to guide the slider to slide thereon to move the main body up and down, and at least one spiral spring having an elasticity enough to support a weight of the main body and to extend and contract in response to a movement of the slider.

According to an aspect of the invention, the guide rail is provided in a pair parallel to each other to stand on the base part at a predetermined distance from each other, and the slider is provided in a pair to correspond to the guide rail to be engaged with the guide rail.

According to an aspect of the invention, the display apparatus further includes a guide bracket to couple to the guide rail and a spring supporting block provided between the sliders. The spiral spring has a first end coupled to the guide bracket and a second end coupled to the spring supporting block.

According to an aspect of the invention, the spiral spring includes a wound part having a spiral shape and coupled to the guide bracket, and a coupling part extended from the wound part and coupled to the spring supporting block.

According to an aspect of the invention, the spiral spring includes a first spiral spring installed in front of the guide bracket, and a second spiral spring installed in the back of the guide bracket.

According to another aspect of the invention, the display apparatus includes a first accommodating part to accommodate the first spiral spring and provided on an inner front face of the guide bracket, a second accommodating part to accommodate the second spiral spring and provided on an inner rear face of the guide bracket, and third and fourth accommodating parts, each to accommodate the pair of guide rails and provided on both sides of the guide bracket.

According to yet another aspect of the invention, the display apparatus includes a supporting unit provided in the first and second accommodating parts to control extension and contraction of the first and second spiral springs. The supporting unit is provided with first and second rotational shafts installed transversely on the first and second accommodating parts, and first and second spring guides rotatably installed on the first and second rotational shafts on which the wound parts of the first and second spiral springs are respectively wound.

According to an aspect of the invention, the display apparatus further includes a ball bearing unit provided between the guide rail and the slider.

According to an aspect of the invention, the ball bearing unit includes a supporting pin disposed between the guide rail and the slider and positioned along a lengthwise direction of the guide rail, and a rolling ball rollably installed on the supporting pin between the guide rail and the slider and contacted with the slider by a rolling motion.

According to an aspect of the invention, the display apparatus includes a supporting bracket provided between the main body and the guide bracket and including a supporting part to support the main body, and an extended part extended downward from the supporting part and coupled to the pair of sliders by passing through the guide bracket.

BRIEF DESCRIPTION OF THE DRAWINGS

The above and/or other aspects and advantages of the present invention will become apparent and more readily appreciated from the following description of the embodiments, taken in conjunction with the accompany drawings of which.

Reference will now be made in detail to the embodiments of the present invention, examples of which are illustrated in the accompanying drawings, wherein like reference numerals refer to like elements throughout. The embodiments are described below in order to explain the present invention by referring to the figures.

As shown in FIGS. 1A through 5, a display apparatus 1 according to the present invention includes a main body (monitor body) 10 to display pictures thereon, a base part 3 to sit on a mounting space (e.g., a table), a stand part 5 to stand on the base part 3, and a connection assembly 7 to connect the stand part 5 to a body bracket 6 fixedly coupled to a rear face of the main body 10.

To a lower part of the connection assembly 7 is coupled a supporting bracket 20 to support the connection assembly 7. The supporting bracket 20 has a supporting part 21 to support the connection assembly 7 and an extended part 22 extended downward from the supporting part 21.

A pair of guide assemblies forming the stand part 5 are respectively disposed on both sides of the extended part 22.

Each of the guide assemblies includes a guide rail 11, and a slider 12 slidingly moved along the guide rail 11. A guide bracket 30 is disposed between the guide rail 11 and the supporting bracket 20.

The guide rail 11 is approximately shaped like a "U" when viewing a section of an inside thereof in which a ball bearing unit 14 is installed along a lengthwise direction. The ball bearing unit 14 includes a supporting pin 15 disposed in the guide rail 11 along the lengthwise direction, and a rolling ball 16 coupled to the supporting pin 15 in a rotatable manner to contact the slider 12 (to be described later) by a rolling motion.

A bottom of the guide rail 11 is coupled to a stand supporting part 2 by screws 38. The stand supporting part 2 is installed on a top face of the base part 3 providing an accommodating space, and a top of the guide rail 11 is coupled to the guide bracket 30. The guide rail 11 is provided in a pair and is disposed in parallel to each other having a predetermined space therebetween.

A top of the slider 12 is coupled to the extended part 22 and a bottom of the slider 12 is coupled to a spring supporting block 13 to be described later. The slider 12 smoothly moves along the guide rail 11 as external wall faces of both sides of the slider 12 are contacted by a rolling motion with the rolling ball 16 within the guide rail 11. For example, the slider 12 may be drawn out from the guide rail 11 to a predetermined length by an upward movement along the guide rail 11.

Meanwhile, the extended part 22 is disposed over a space provided between a pair of sliders 12 which are separated from each other, and the spring supporting block 13 is disposed below the space.

The sliders 12 are coupled to both sides of the spring supporting block 13. First and second spiral springs 41 and 42, to be described later, are respectively coupled to a front face and a rear face of the spring supporting block 13 by screws 39. By this coupling, if the sliders 12 perform a sliding motion, the spring supporting block 13 coupled to the sliders 12 is moved together with the sliders 12. Since the first and second spiral springs 41 and 42 are coupled to the spring supporting block 13 moving together with the sliders 12, the first and second spiral springs 41 and 42 are extended and contracted according to the movement of the spring supporting block 13 coupled to the sliders 12.

An elasticity of the first and second spiral springs 41 and 42 is set to be equal to a weight of the main body 10. Preferably, the first and second spiral springs 41 and 42 may be formed of stainless steel with a thickness of 0.2 mm to 0.35 mm.

The first and second spiral springs 41 and 42 include a wound part 43 spirally wound and mounted to the guide bracket 30, and a coupling part 44 extended from the wound part 43 and coupled to the spring supporting block 13.

A first accommodating part 31 on which the first spiral spring 41 is installed is provided on an inner front face of the guide bracket 30, and a second accommodating part 32 on which the second spiral spring 42 is installed is provided on an inner rear face of the guide bracket 30. Third and fourth accommodating parts 33 and 34 to accommodate the pair of guide assemblies (i.e., the guide rails 11 and the sliders 12) are respectively provided on both sides of the guide bracket 30.

The tops of the guide rails 11 of the guide assemblies are inserted into the third and fourth accommodating parts 33 and 34 respectively and are fixed by screws 37.

On the first and second accommodating parts 31 and 32 are respectively provided a supporting unit to allow extension and contraction, that is, to allow the first and second spiral springs 41 and 42 to be unwound and wound.

The supporting unit includes first and second rotational shafts 51 and 52 transversely on the first and second accommodating parts 31 and 32, respectively, and first and second spring guides 53 and 54 made of plastic material, rotatably installed on the first and second rotational shafts 51 and 52, respectively, on which the first and second spring springs 41 and 42 are wound. Since the coupling part 44 of the first and second spiral springs 41 and 42 are coupled to the spring supporting block 13 connected to the sliders 12, the wound part 43 of the first and second spiral springs 41 and 42 are unwound along circumferences of the first and second spring guides 53 and 54 by a rotation of the first and second rotational shafts 51 and 52 when the sliders 12 and the spring supporting block 13 move downward. In response thereto, the coupling part 44 of the first and second spiral springs 41 and 42 moves downward along with the spring supporting block 13.

Figure 3:
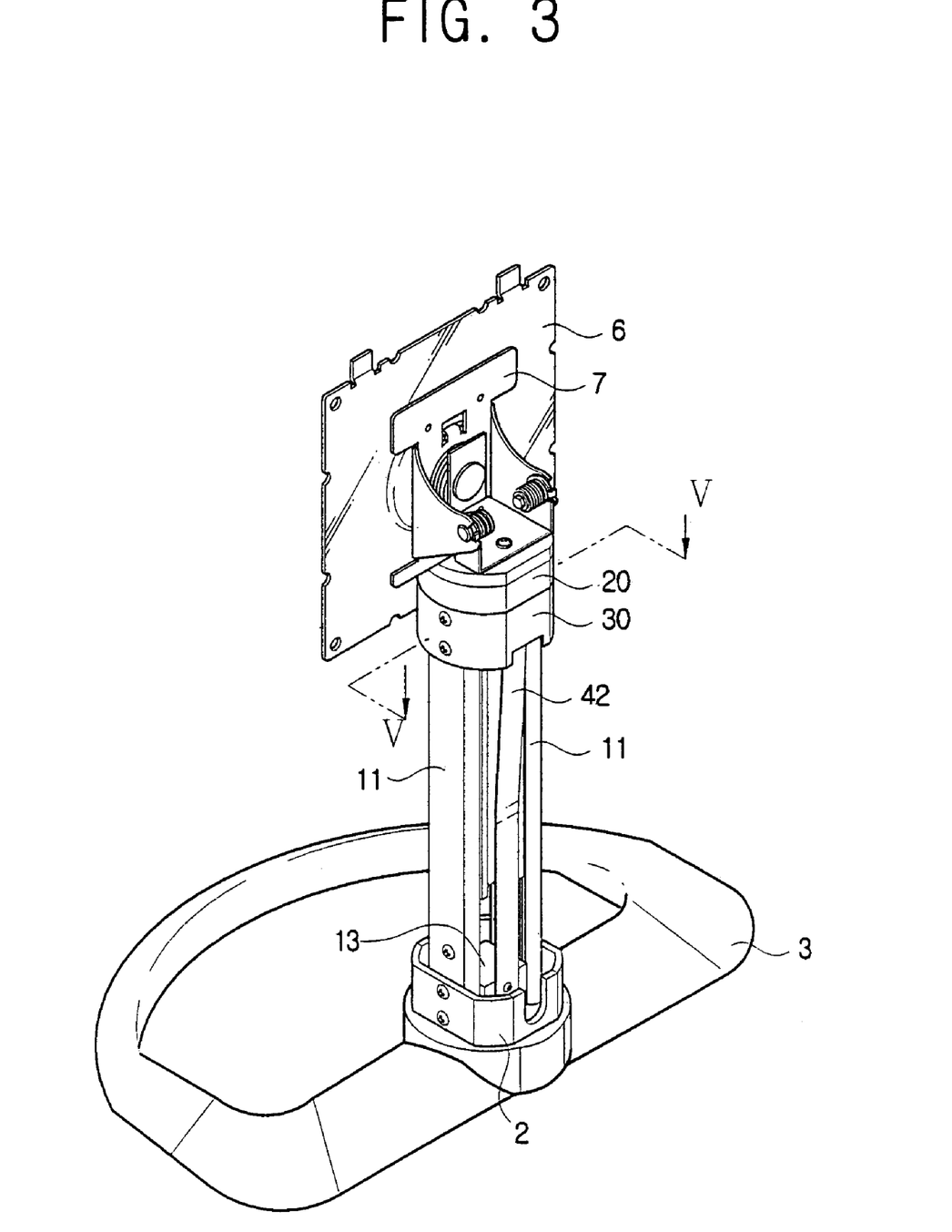
FIG. 3 is a rear perspective view showing a lowering state of the slider in the display apparatus shown in FIG. 3.
Figure 4:
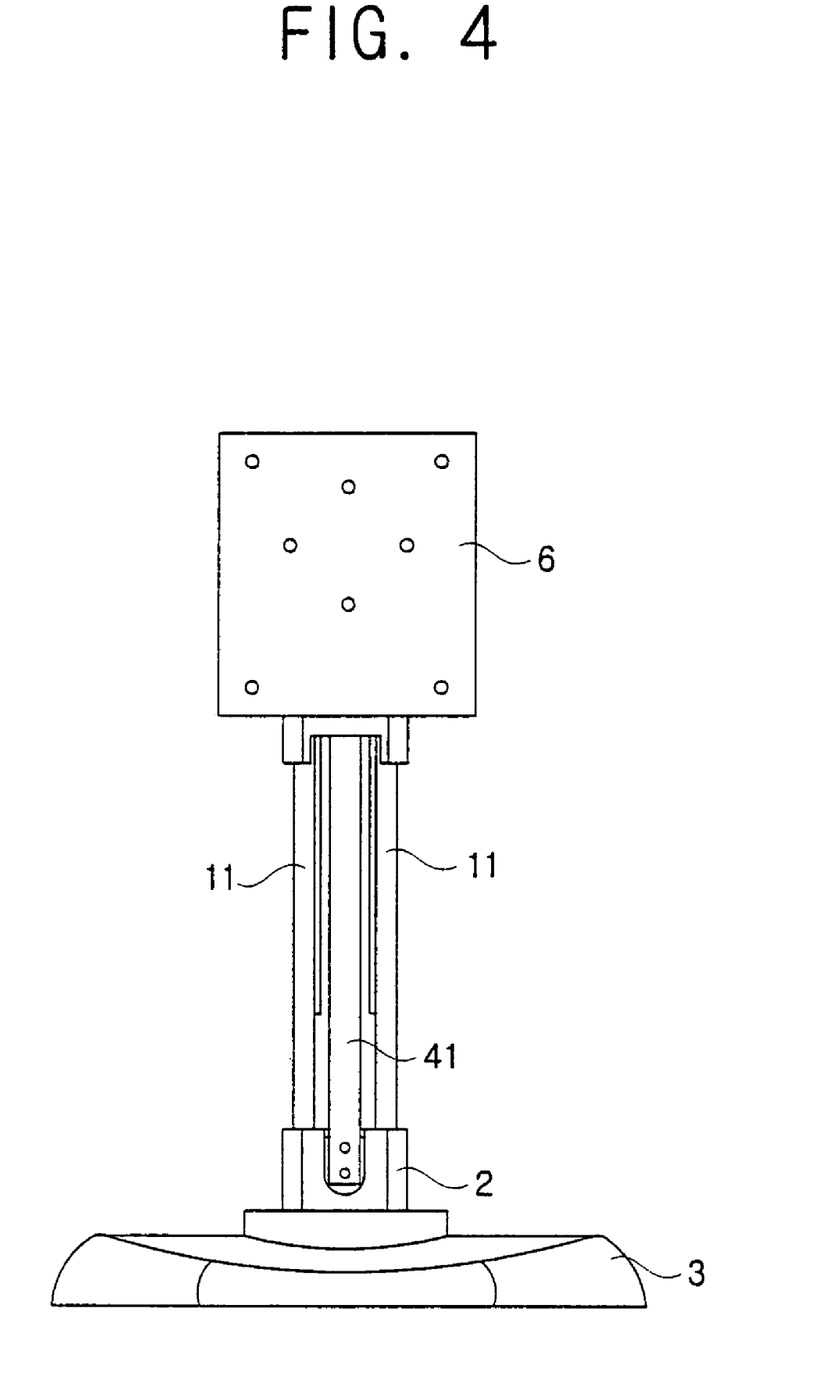
FIG. 4 is a front elevational view showing a lowering state of the slider in the display apparatus shown in FIG. 3.
Figure 5:
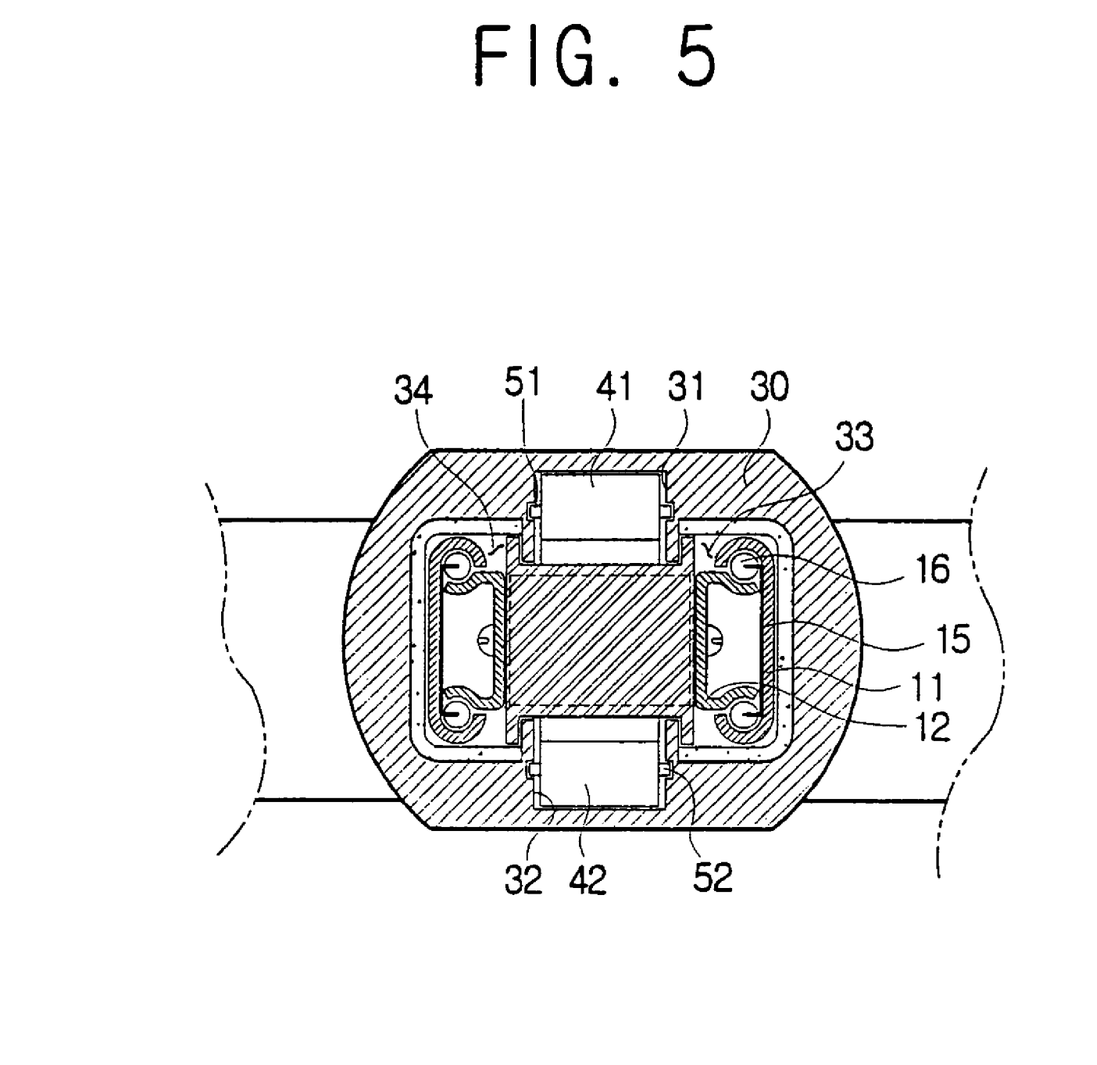
FIG. 5 is a sectional view of FIG. 3 taken along V—V.

That is, the first and second spiral springs 41 and 42 are extended (see FIGS. 3 and 4). Conversely, the wound parts 43 of the first and second spiral springs 41 and 42 are wound along the circumferences of the first and second spring guides 53 and 54 by the rotation of the first and second rotational shafts 51 and 52 when the sliders 12 and the spring supporting block 13 move upward. In response thereto, the coupling part 44 of the first and second spiral springs 41 and 42 move upward along with the spring supporting block 13. That is, the first and second spiral springs 41 and 42 are contracted (see FIG. 1b).

In light of the above configuration, an elevating process of the sliders 12 relative to the guide rails 11 will be described below.

Figure 1A:
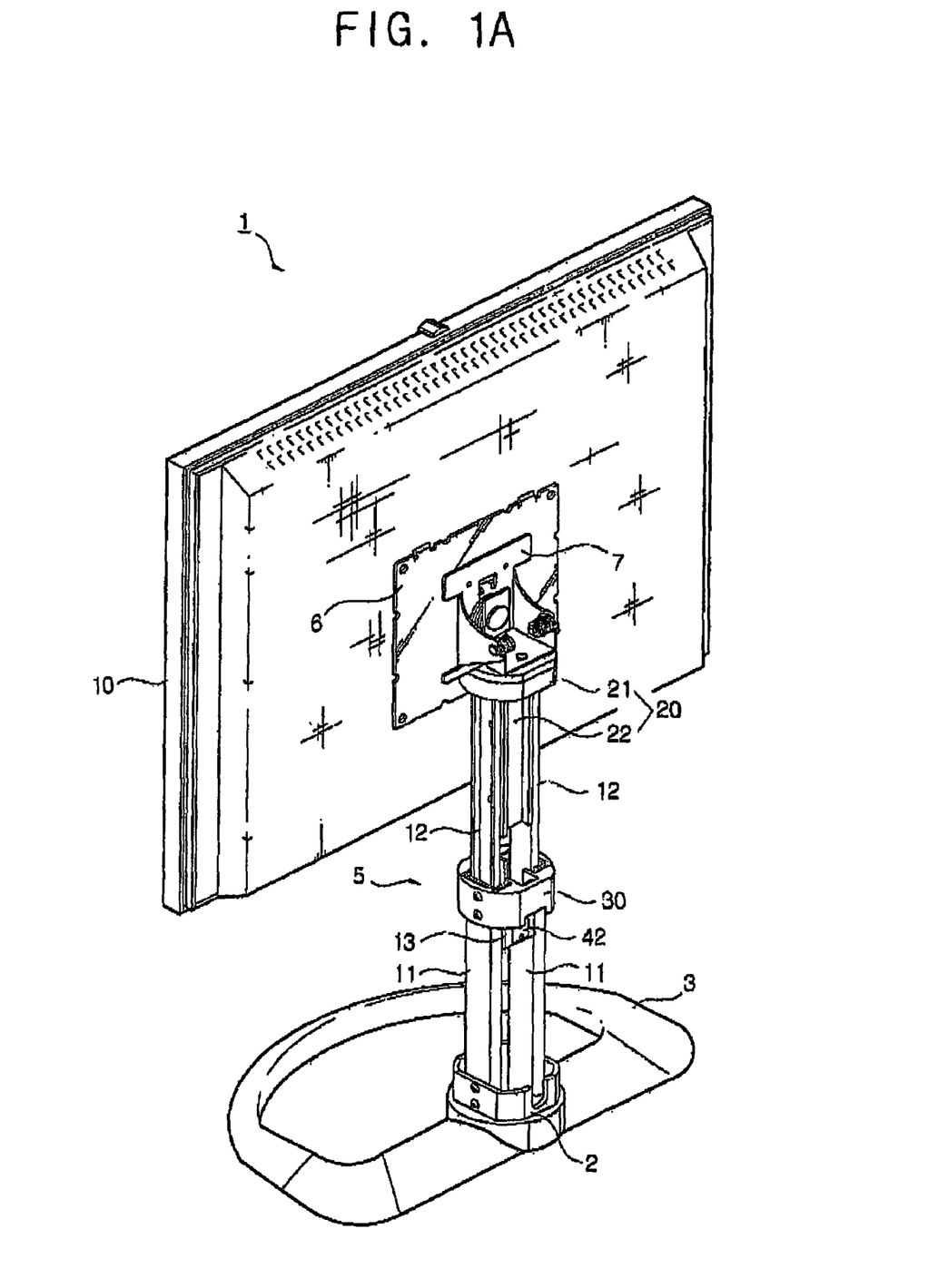
FIGS. 1A and 1B are rear perspective views showing an elevating state of a slider in a display apparatus, according to an embodiment of the present invention.
Figure 1B:
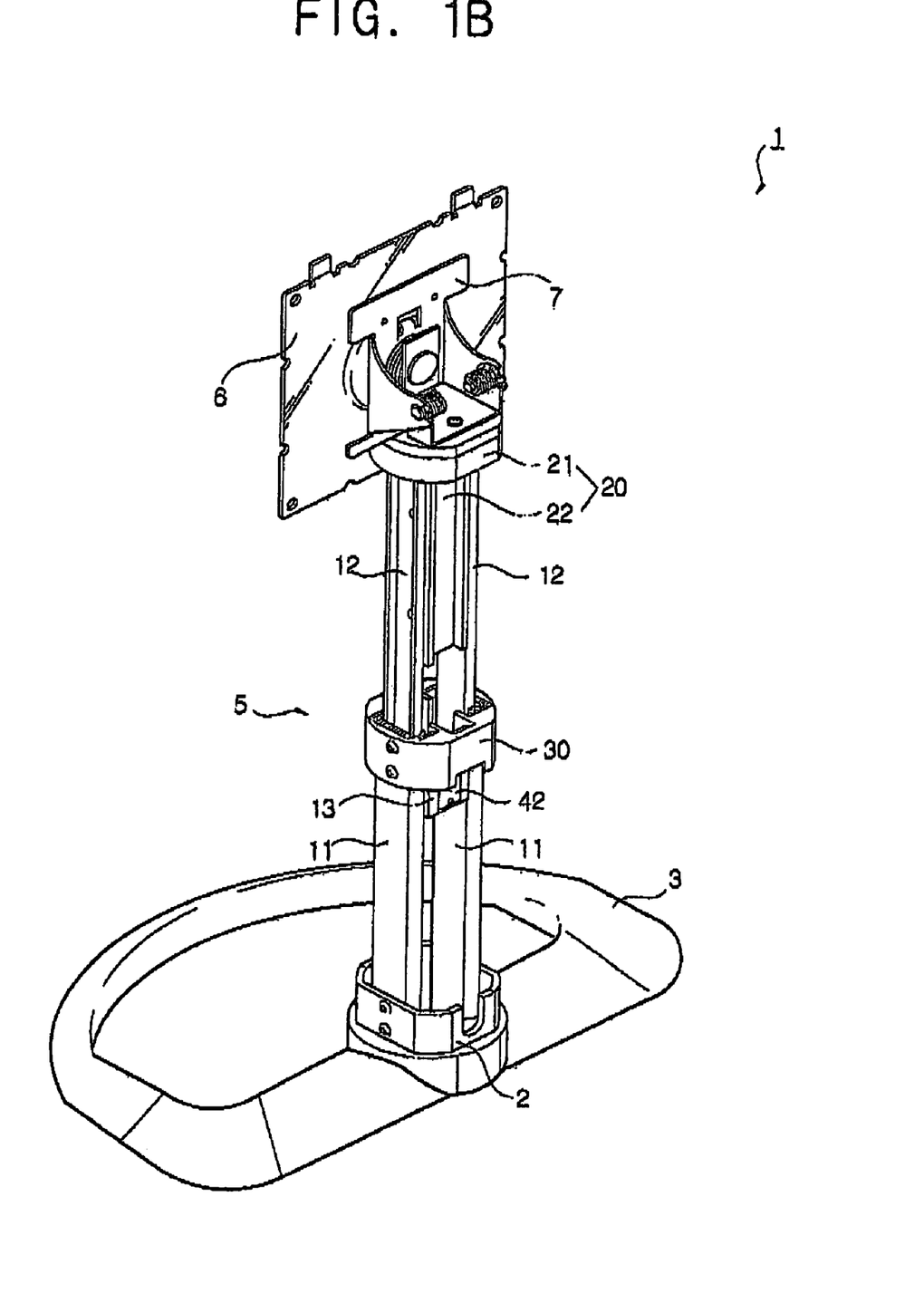
Figure 2:
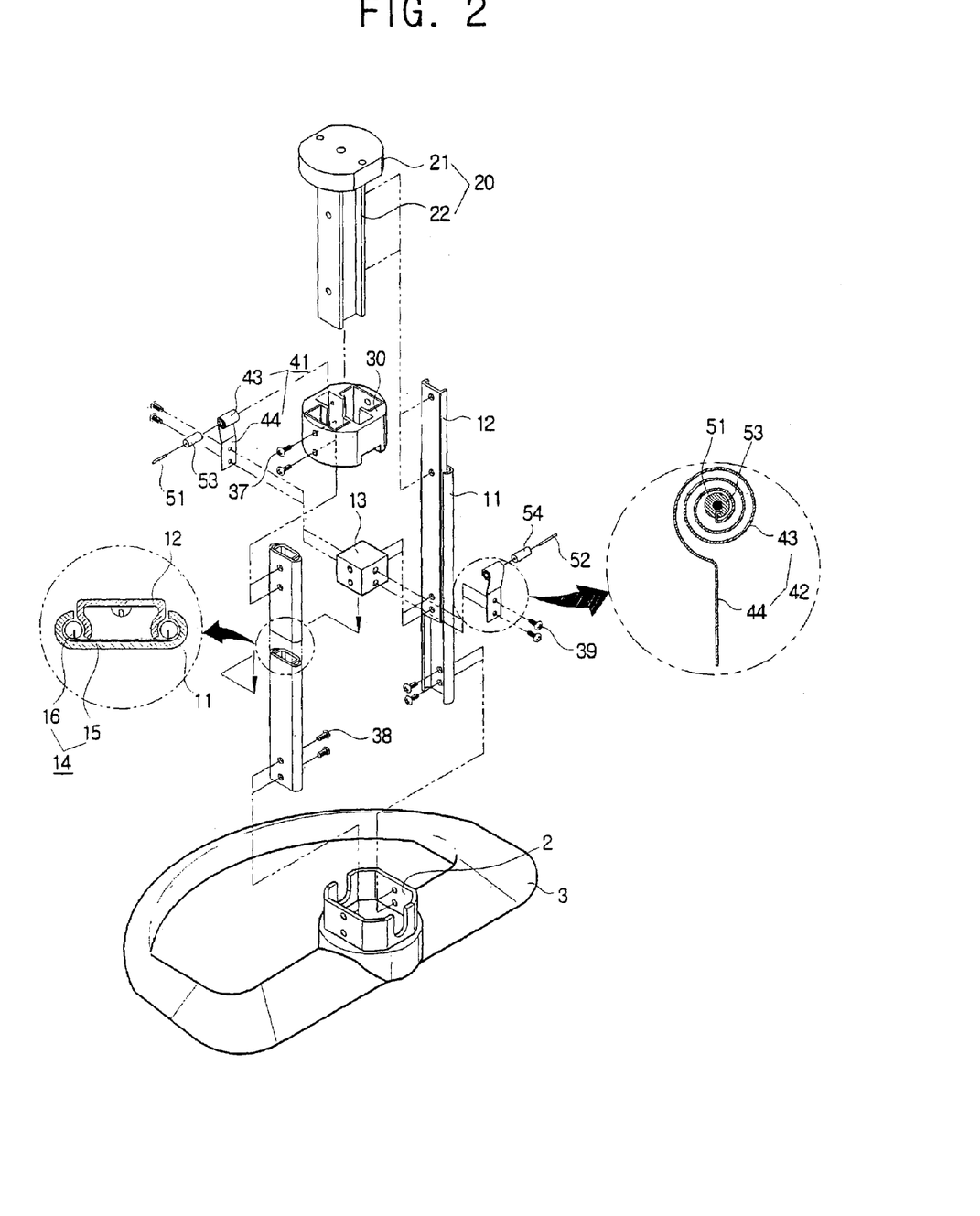
FIG. 2 is an exploded perspective view showing a main portion of the display apparatus shown in FIG. 1B.

It is assumed that an initial status of the display apparatus according to the present invention is as illustrated in FIG. 1B. Thus, if a user holds the main body 10 and moves it downward so as to lower a position of the main body 10, the sliders 12 move downward along the guide rails 11 to contact the rolling ball 16 by a rolling motion. At this time, since the spring supporting block 13 is coupled to the sliders 12, the spring supporting block 13 moves downward in response to the downward movement of the sliders 12, and the coupling part 44 of the first and second spiral springs 41 and 42 coupled to the spring supporting block 13 moving downward, also moves downward.

The downward movement of the coupling part 44 of the first and second spiral springs 41 and 42 is possible because the spiral wound parts 43 of the first and second spiral springs 41 and 42 are respectively extended to be unwound along the circumferences of the first and second spring guides 53 and 54 in response to the downward movement of the coupling part 44 of the first and second spiral springs 41 and 42.

The above operation is done under the condition that the weight of the main body 10 moves downward beyond the elasticity of the first and second spiral springs 41 and 42. If the user suspends the downward movement of the main body 10 when the main body 10 reaches a height that the user desires to position it while the main body 10 is in downward movement, the main body 10 will not move downward any more. That is, since the weight of the main body 10 and the elasticity of the first and second spiral springs 41 and 42 are balanced, the movement of the main body 10 stops (see FIGS. 3 and 4).

If the user holds the main body 10 and moves it upward so as to raise the position of the main body 10, the balance between the weight of the main body 10 and the elasticity of the first and second spiral springs 41 and 42 is not stable, and therefore, the main body 10 moves upward in the same operation as described above. If the user suspends the upward movement of the main body 10 when the main body 10 reaches the height that the user desires to position it, the main body 10 will not move upward any more since the weight of the main body 10 and the elasticity of the first and second spiral springs 41 and 42 are balanced (see FIG. 1B).

In the display apparatus 1 according to the present invention, the sliders 12 smoothly move along the guide rails 11 via the ball bearing unit 14, and easily adjust the position of the main body 10 with the first and second spiral springs 41 and 42.

In the above-described embodiment, the first and second spiral springs 41 and 42 are provided. However, one spiral spring may be installed with the elasticity of the one spiral spring being set equal to the weight of the main body 10.

In the above-described embodiment, the number of spiral springs installed is two, that is, the first and second spiral springs 41 and 42. However, four spiral springs may be installed in the display apparatus according to the present invention. It should be noted that the number of spiral springs which may be installed in the display apparatus according to the present invention is not limited to two or four, but may be determined optionally by display apparatus makers.

As described above, according to the present invention, there is provided a display apparatus having an improved structure of conveniently adjusting a position of the main body 10 because the slider may be slid smoothly along the guide bracket.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus, comprising:
    a base part;
    a monitor body;
    a body bracket fixedly coupled to the monitor body;
    a pair of sliders connected with the body bracket;
    a pair of guide rails provided parallel to each other to stand on the base part at a predetermined distance from each other, and to guide the sliders to slide thereon so as to move the monitor body up and down, the sliders corresponding to the guide rails to be engaged therewith;
    at least one spiral spring having an elasticity enough to support weight of the monitor body, to extend and contract in response to a movement of the slider;
    a guide bracket coupled to the guide rails; and
    a spring supporting block provided between and coupled to the sliders and performing a sliding motion along with a movement of the pair of sliders,
    wherein the at least one spiral spring has a first end coupled to the guide bracket and a second end coupled to the spring supporting block.

2. The display apparatus according to claim 1, wherein the at least one spiral spring comprises:
    a wound part having a spiral shape and coupled to the guide bracket; and
    a coupling part extended from the wound part and coupled to the spring supporting block.

3. The display apparatus according to claim 2, wherein the at least one spiral spring comprises:
    a first spiral spring installed in front of the guide bracket; and
    a second spiral spring installed in the back of the guide bracket.

4. The display apparatus according to claim 3, further comprising:
    a first accommodating part to accommodate the first spiral spring and provided on an inner front face of the guide bracket;
    a second accommodating part to accommodate the second spiral spring and provided on an inner rear face of the guide bracket; and
    third and fourth accommodating parts, each to accommodate the pair of guide rails and provided on both sides of the guide bracket.

5. The display apparatus according to claim 4, further comprising:
    a supporting unit provided in the first and second accommodating parts to control extension and contraction of the first and second spiral springs, the supporting unit including:
        first and second rotational shafts installed transversely on the first and second accommodating parts; and
        first and second spring guides rotatably installed on the first and second rotational shafts on which the wound parts of the first and second spiral springs are respectively wound.

6. A display apparatus, comprising:
    a base part;
    a monitor body;
    a body bracket fixedly coupled to the monitor body;
    a slider connected with the body bracket;
    a guide rail to stand on the base part, and to guide the slider to slide thereon so as to move the monitor body up and down;
    at least one spiral spring having an elasticity enough to support weight of the monitor body, to extend and contract in response to a movement of the slider; and
    a ball bearing unit provided between the guide rail and the slider,
    wherein the ball bearing unit comprises:
        a supporting pin disposed between the guide rail and the slider and positioned along a lengthwise direction of the guide rail; and a rolling ball rollably installed on the supporting pin between the guide rail and the slider and contacted with the slider by rolling motion.

7. The display apparatus according to claim 6, further comprising:
a guide bracket coupled to the guide rail; and
a supporting bracket provided between the monitor body and the guide bracket and having a supporting part to support the monitor body, and an extended part extended downward from the supporting part and coupled to the slider by passing through the guide bracket.

8. A display apparatus, comprising:
a base part;
a monitor body;
a body bracket fixedly coupled to the monitor body;
a slider connected with the body bracket;
a guide rail to stand on the base part, and to guide the slider to slide thereon so as to move the monitor body up and down;
at least one spiral spring having an elasticity enough to support weight of the monitor body, to extend and contract in response to a movement of the slider; and
a ball bearing unit provided between the guide rail and the slider,
wherein the guide rail is provided in a pair parallel to each other to stand on the base part at a predetermined distance from each other, and the slider is provided in a pair to correspond to the guide rail to be engaged with the guide rail, and
wherein the ball bearing unit comprises:
a supporting pin disposed between the guide rail and the slider and positioned along a lengthwise direction of the guide rail; and
a rolling ball rollably installed on the supporting pin between the guide rail and the slider and contacted with the slider by a rolling motion.

9. The display apparatus according to claim 8, further comprising:
a supporting bracket provided between the monitor body and the guide bracket and having a supporting part to support the monitor body, and an extended part extended downward from the supporting part and coupled to the pair of sliders by passing through the guide bracket.

10. The display apparatus according to claim 1, further comprising:
a ball bearing unit between the guide rail and the slider.

11. The display apparatus according to claim 10, wherein the ball bearing unit comprises:
a supporting pin disposed between the guide rail and the slider and positioned along a lengthwise direction of the guide rail; and
a rolling ball rollably installed on the supporting pin between the guide rail and the slider and contacted with the slider by a rolling motion.

12. The display apparatus according to claim 11, further comprising:
a supporting bracket provided between the monitor body and the guide bracket and having a supporting part to support the monitor body, and an extended part extended downward from the supporting part and coupled to the pair of sliders by passing through the guide bracket.

13. The display apparatus according to claim 2, further comprising:
a ball bearing unit provided between the guide rail and the slider.

14. The display apparatus according to claim 13, wherein the ball bearing unit comprises:
a supporting pin disposed between the guide rail and the slider and positioned along a lengthwise direction of the guide rail; and
a rolling ball rollably installed on the supporting pin between the guide rail and the slider and contacted with the slider by a rolling motion.

15. The display apparatus according to claim 14, further comprising:
a supporting bracket provided between the monitor body and the guide bracket and having a supporting part to support the monitor body, and an extended part extended downward from the supporting part and coupled to the pair of sliders by passing through the guide bracket.

16. The display apparatus according to claim 3, further comprising: a ball bearing unit provided between the guide rail and the slider.

17. The display apparatus according to claim 16, wherein the ball bearing unit comprises:
a supporting pin disposed between the guide rail and the slider and positioned along a lengthwise direction of the guide rail; and
a rolling ball rollably installed on the supporting pin between the guide rail and the slider and contacted with the slider by a rolling motion.

18. The display apparatus according to claim 17, further comprising:
a supporting bracket provided between the monitor body and the guide bracket and having a supporting part to support the monitor body, and an extended part extended downward from the supporting part and coupled to the pair of sliders by passing through the guide bracket.

19. The display apparatus according to claim 4, further comprising:
a ball bearing unit provided between the guide rail and the slider.

20. The display apparatus according to claim 19, wherein the ball bearing unit comprises:
a supporting pin disposed between the guide rail and the slider and positioned along a lengthwise direction of the guide rail; and
a rolling ball rollably installed on the supporting pin between the guide rail and the slider and contacted with the slider by a rolling motion.

21. The display apparatus according to claim 20, further comprising:
a supporting bracket provided between the monitor body and the guide bracket and having a part to support the monitor body, and an extended part extended downward from the supporting part and coupled to the pair of sliders by passing through the guide bracket.

22. The display apparatus according to claim 5, further comprising:
a ball bearing unit provided between the guide rail and the slider.

23. The display apparatus according to claim 22, wherein the ball bearing unit comprises:
a supporting pin disposed between the guide rail and the slider and positioned along a lengthwise direction of the guide rail; and
a rolling ball rollably installed on the supporting pin between the guide rail and the slider contacted with the slider by a rolling motion.

24. The display apparatus according to claim 23, further comprising:
a supporting bracket provided between the monitor body and the guide bracket and having a supporting part to support the monitor body, and an extended part extended downward from the supporting part and coupled to the pair of sliders by passing through the guide bracket.

25. The display apparatus according to claim 24, wherein the guide bracket is displaced between the guide rail and the supporting bracket.

26. The display apparatus according to claim 1, further comprising:
a stand supporting part installed on the base part to provide an accommodating space for the pair of guide rails.

27. The display apparatus according to claim 23, wherein the slider smoothly moves along the guide rail as external wall faces of both sides of the slider are contacted by the rolling motion with the rolling ball within the guide rail.

28. The display apparatus according to claim 1, wherein the slider is drawn out from the guide rail to a predetermined length by an upward movement along the guide rail.

29. The display apparatus according to claim 1, wherein the first and second spiral springs are coupled to the spring supporting block which moves together with the sliders and are extended and contracted according to the movement of the spring supporting block coupled to the sliders.

30. The display apparatus according to claim 3, wherein the first and second spiral springs are made of stainless steel with a thickness of 0.2 mm to 0.35 mm.

31. The display apparatus according to claim 5, wherein the first and second spiral springs include the coupling part to couple to the spring supporting block coupled to the sliders, and the wound part of the first and second spiral springs are unwound along circumferences of the first and second spring guides by a rotation of the first and second rotational shafts when the sliders and the spring supporting block move downward.

32. The display apparatus according to claim 31, wherein the wound part of the first and second spiral springs are wound along the circumferences of the first and second spring guides by the rotation of the first and second rotational shafts when the sliders and the spring supporting block move upward.

33. A display apparatus, comprising:
a monitor body;
a body bracket fixedly coupled to the monitor body;
a base part;
a stand part to stand on the base part, the stand part comprising
 a slider to connect with the monitor body, and
 a guide rail to stand on the base part, and to guide the slider to slide thereon so as to move the monitor body up and down;
a connecting assembly to connect the stand part to the body bracket;
a supporting bracket to support the connecting assembly a spring supporting block coupled to the slider and performing a sliding motion along with a movement of the slider; and
at least one spiral spring supported by the spring support block and having an elasticity enough to support weight of the monitor body to extend and contract in response to a movement of the slider.

34. A display apparatus, comprising:
a base part;
a guide rail extending from the base part;
a slider, guided by the guide rail to translate thereon;
a ball bearing unit provided between the guide rail and the slider;
a body bracket to be fixedly coupled to a monitor body;
a supporting bracket connected with the slider;
a connecting assembly connected between the supporting bracket and the body bracket; and
at least one spiral spring having an elasticity sufficient to support a weight of the monitor body, to extend and contract in response to a movement of the slider.

* * * * *

UNITED STATES PATENT AND TRADEMARK OFFICE
CERTIFICATE OF CORRECTION

PATENT NO. : 7,424,991 B2  Page 1 of 1
APPLICATION NO. : 10/671863
DATED : September 16, 2008
INVENTOR(S) : Ju-hwan Kim et al.

It is certified that error appears in the above-identified patent and that said Letters Patent is hereby corrected as shown below:

Title Page, Column 1 (Inventors), Line 2, change "Dong-hyug Kim" to --Dong-hyung Kim--.

Column 7, Line 3, after "rolling" insert --a--.

Column 8, Lines 15-16, after "comprising:" delete "a ball bearing unit provided between the guide rail and the slider." and insert the same below "comprising:" as a new line.

Column 10, Lines 8-9, after "comprising" insert --;--.

Column 10, Line 16, change "assembly" to --assembly;--.

Column 10, Lines 16-19, after "assembly" delete "a spring supporting block coupled to the slider and performing a sliding motion along with a movement of the slider; and" insert the same below "assembly" as a new line.

Signed and Sealed this

Tenth Day of February, 2009

JOHN DOLL
*Acting Director of the United States Patent and Trademark Office*